United States Patent Office 3,116,306
Patented Dec. 31, 1963

3,116,306
PROCESS FOR PREPARING CARBOXYLATED ORGANIC COMPOUNDS
Richard F. Heck, McDaniel Crest, Wilmington, Del., assignor to Hercules Powder Company, Wilmington, Del., a corporation of Delaware
No Drawing. Filed Dec. 8, 1960, Ser. No. 74,476
21 Claims. (Cl. 260—410.9)

This invention relates to the preparation of carboxylated organic compounds. More particularly, this invention relates to a new process for preparing carboxylic acids and derivatives of carboxylic acids such as their salts, esters, thio-esters, amides, hydrazides, and the like.

According to the present invention, carboxylated organic compounds are prepared by reacting together ingredients consisting essentially of (1) an organic compound represented by the general formula $R_nZ$ in which R is an organic group having at least one radical of the class consisting of aliphatic radicals and cycloaliphatic radicals within said group, Z is a substituent of the class consisting of $SO_4$, X, $X_2$, and $R'SO_3$ substituents in which X is a halogen and R' represents an organic radical of the group consisting of alkyl, alkenyl, cycloalkyl, aryl and aralkyl radicals, n is 1 when Z is one of the group X, $X_2$ and $R'SO_3$, and n is 2 when Z is $SO_4$, said Z substituent being attached to carbon atoms of the group consisting of primary carbon atoms and secondary carbon atoms within said aliphatic radicals and said cycloaliphatic radicals, (2) carbon monoxide, (3) a salt of a metal hydrocarbonyl of the group consisting of cobalt hydrotetracarbonyl and iron dihydrotetracarbonyl, and (4) a material of the group consisting of water, alcohols, phenols, mercaptans, ammonia, hydrazine, primary organo-nitrogen bases and secondary organo-nitrogen bases under basic conditions of reaction.

Although it is not intended that the invention be limited by any particular theory of reaction, it is presently postulated that the process involves reaction of an organic compound, $R_nZ$, with a salt of cobalt or iron hydrocarbonyl to form an intermediate and unstable organo-metal carbonyl complex which then absorbs carbon monoxide to form an acyl metal carbonyl complex. It is additionally postulated that the latter complex then reacts with water, an alcohol, a phenol, a mercaptan, ammonia, hydrazine, or a primary or secondary organo-nitrogen base under basic conditions of reaction to form, respectively, a salt, ester, thio-ester, amide, hydrazide, or the like, of a carboxylic acid. The free carboxylic acids are readily obtained by conventional hydrolysis with acidification of any of the above-set-forth salts, esters, thio-esters, amides, etc.

The above-postulated mechanism will be more clearly understood by reference to the following generalized equations for illustrative purposes:

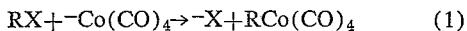  (1)
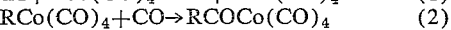  (2)
  (3)
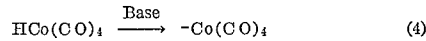  (4)

in which R represents an organic group containing an aliphatic or cycloaliphatic radical such as, for example, an alkyl, alkenyl, benzyl, etc., group; X represents a halogen; and BH represents water, alcohol, phenol, mercaptan, ammonia, hydrazine or a primary or secondary organo-nitrogen base.

The reaction mixture must be basic in order to reform metal carbonyl anion, to keep metal hydrocarbonyl from accumulating and to keep the metal of the carbonyl compound in a catalytically active form. An accumulation of metal hydrocarbonyl is undesirable, since metal hydrocarbonyl reacts with the acyl metal carbonyl complex to form aldehyde as follows:

$$HCo(CO)_4 + RCOCo(Co_4) \rightarrow RCHO + Co_2(CO)_8 \quad (5)$$

thus destroying the active acyl metal carbonyl complex and converting the metal of the carbonyl compound to an inactive state for the purposes of the invention.

It will be seen from generalized Equations 1 to 4 above that the process is catalytic in nature with respect to employment of a salt of cobalt or iron hydrocarbonyl, since the active metal carbonyl anion is regenerated according to the postulated mechanism. Ordinarily, the process of this invention is carried out in one step having all of the necessary reactants present at one time in the reaction mixture. However, in some instances it may be convenient or desirable to practice the invention as a two-step process, the first step involving reaction of an organic compound represented by the general formula $R_nZ$, as set forth hereinbefore, and carbon monoxide in the presence of a salt of a cobalt or iron hydrocarbonyl to form an acyl metal carbonyl complex, and, as the second step, thereafter reacting the thus-formed acyl metal carbonyl complex with water, alcohol, phenol, mercaptan, ammonia, hydrazine or organo-nitrogen base under basic conditions of reaction. A typical example where it would be desirable to practice the invention as a two-step process is in cases where the organic compound, $R_nZ$, employed is very reactive and reacts with the water, alcohol, phenol, mercaptan, ammonia, hydrazine, or organo-nitrogen base at a comparable or faster rate than it does with the metal carbonyl anion. In such cases the acyl metal carbonyl complex can be made in an inert solvent such as ether, tetrahydrofuran, or dimethyl ether of diethylene glycol, and thereafter reacting the thus-formed acyl metal carbonyl complex with water, alcohol, phenol, mercaptan, ammonia, hydrazine, or nitrogen base under basic conditions of reaction. The process of this invention can be carried out either batch-wise or continuously, as desired.

As pointed out hereinbefore, one of the essential ingredients for practice of this invention is an organic compound represented by the general formula, $R_nZ$, in which R is an organic group having at least one aliphatic or cycloaliphatic radical within said group, Z is a substituent of the class consisting of X, $X_2$, $SO_4$ and $R'SO_3$ substituents in which X is a halogen and R' is an alkyl, alkenyl, cycloalkyl, aryl or aralkyl radical, n is 1 when Z is one of the group X, $X_2$ and $R'SO_3$, and n is 2 when Z is $SO_4$, said Z substituent being attached to primary or secondary carbon atoms within said aliphatic or cycloaliphatic radicals. This invention, therefore, contemplates the use of a wide variety of acyclic, alicyclic and aralkyl compounds in which the Z substituent is attached to primary or secondary aliphatic or cycloaliphatic carbon atoms, and, therefore, a wide variety of organic halides, diesters of sulfuric acid, and esters of sulfonic acids. In this respect, the invention further contemplates the use of any halogen, namely, fluorine, chlorine, bromine and iodine.

For the purposes of this invention, the symbol R in the formula $R_nZ$ may be alkyl, such as methyl, ethyl, propyl, isopropyl, butyl, amyl, octyl, dodecyl, stearyl, and the like; substituted alkyl, such as nitroalkyl, nitratoalkyl, cyanoalkyl, alkoxyalkyl, acyl alkyl, acyloxyalkyl, such as, for example, nitromethyl, nitroethyl, nitratomethyl, nitratoethyl, cyanomethyl, cyanoethyl, cyanoisobutyl, methoxymethyl, ethoxyethyl, butoxyethyl, acetylmethyl, propionylethyl, acetoxymethyl, butyroxyethyl, and the like; ethylenically unsaturated aliphatic radicals such as crotyl, methallyl, butenyl, pentenyl, undecenyl, allyloxymethyl, propenyloxymethyl, methallyloxymethyl, oleyl, and the like; cycloalkyl radicals such as tetrahydrofurfuryl, cyclopentyl, cyclohexyl, methyl cyclohexyl, vinyl cyclohexyl, and the like; aralkyl radicals such as benzyl, phenethyl, phenylpropyl, phenylallyl, p-vinylbenzyl, phenylisopropyl, phenyloctyl, methoxybenzyl, xylyl, α-naphthylmethyl, β-naphthylmethyl, and the like; 1,1-dialkoxyalkyl radicals such as diethyl butyraldehyde acetal and the like; and heterocyclic radicals such as methylene thiophene, dimethylene thiophene, and the like.

It has been found that organic halides suitable for the purposes of this invention are monohalogen and dihalogen substituted organic compounds having at least one aliphatic or cycloaliphatic radical within the molecule and in which the halogen is attached to primary or secondary carbon atoms within said aliphatic or cycloalphatic radicals. By way of example, but not in limitation of the invention, suitable organic halides include alkyl halides, such as methyl chloride, methylene chloride, ethyl chloride, ethyl bromide, ethylene dichloride, amyl chloride, 3-chloropropane, amyl iodide, octyl iodide, 2-iodooctane, oleyl chloride, stearyl bromide, dichlorobutane, chlorinated kerosene, and the like; alkenyl halides, such as allyl chloride, allkyl bromide, crotyl chloride, crotyl fluoride, methallyl chloride, pentenyl chloride, pentenyl iodide, undecenyl chloride, dichloropentene, and the like; aralkyl halides, such as benzyl chloride, ortho-, meta- and para-methoxy benzyl chlorides, α-monochloro-xylene and α,α'-dichloro-xylene (ortho, meta or para), α-chloromethylnaphthalene, β-chloromethylnaphthalene, α-chloromesitylene, benzyl fluoride, benzyl bromide, benzyl iodide, veratryl chloride, α-iodoxylene (ortho, meta or para), methyl p-chloromethylbenzoate, and the like; haloesters, such as methyl chloroacetate, ethyl bromoacetate, methyl 3-chloropropionate, and the like; salts of haloacids, such as sodium chloroacetate, sodium chloropropionate, and the like; halonitriles, such as 3-chloropropionitrile, chloroacetonitrile, 3-bromobutyronitrile, and the like; haloethers, such as β-chloroethyl ethyl ether, β,β'-dichlorodiethyl ether, chloromethyl isobutyl ether, β-bromoethyl vinyl ether, α-chloropropyl propyl ether and the like; cycloaliphatic halides, such as cyclohexyl chloride, cyclopentyl bromide, tetrahydrofurfuryl chloride, and the like; haloketones, such as chloroacetone, and the like; haloacetals, such as diethyl 4-chlorobutylraldehyde acetal and the like; and heterocyclic halides, such as chloromethylthiophene, and the like.

Mixtures of organic halides may be used, and in some cases, it is possible to selectively react components of such mixtures if the halides present vary in their reactivity.

Typically suitable sulfuric acid diesters for the purposes of this invention include, for example, dialkyl sulfates such as dimethyl sulfate, diethyl sulfate, dipropyl sulfate, diisopropyl sulfate, dibutyl sulfate, dihexyl sulfate, dioctyl sulfate, didodecyl sulfate, and the like; dicycloalkyl sulfates such as dicyclopentyl sulfate, dicyclohexyl sulfate, di-methylcyclohexyl sulfate, and the like; diaralkyl sulfates such as dibenzyl sulfate, diphenethyl sulfate, di-α-naphthylmethyl sulfate, and the like; dialkenyl sulfates such as diallyl sulfate, dipentenyl sulfate, dimethallyl sulfate, and the like; as well as dialkoxyalkyl sulfates, diacylalkyl sulfates, diacyloxyalkyl sulfates, dicyanoalkyl sulfates, and any other sulfate diester wherein the organic group substituent corresponds to R in the general formula, $R_nZ$.

Any sulfonic acid may be employed for preparing the sulfonic acid esters corresponding to the general formula $R_nZ$, as set forth hereinbefore, and include, by way of example, alkylsulfonic acids, alkenylsulfonic acids, cycloalkylsulfonic acids, arylsulfonic acids, aralkylsulfonic acids, and the like. Some typically suitable sulfonic acids for the purposes of this invention are methanesulfonic acid, ethanesulfonic acid, ethylenesulfonic acid, α-toluenesulfonic acid, cyclohexanesulfonic acid, o-, m- or p-toluenesulfonic acid, naphthalenesulfonic acid, α-methylnaphthalenesulfonic acid, and the like. Since R in the general formula $R_nZ$ for the sulfonate esters of this invention has already been described, there is no need for further description at this point. Some typically suitable sulfonate esters include methyl p-toluenesulfonate, octyl methanesulfonate, benzyl ethylenesulfonate, cyclohexyl α-toluenesulfonate, allyl cyclohexanesulfonate, and the like.

As pointed out hereinbefore, it is postulated that the organic compound, $R_nZ$, reacts with a salt of a metal hydrocarbonyl of the group consisting of cobalt hydrotetracarbonyl and iron dihydrotetracarbonyl to form an intermediate and unstable organometal carbonyl complex which then absorbs carbon monoxide to form an acyl metal carbonyl complex. This invention contemplates the use of any salt of cobalt hydrotetracarbonyl or iron dihydroettracarbonyl for this purpose, and salt-forming cations include those derived from metal atoms capable of forming salts of cobalt hydrotetracarbonyl and iron dihydrotetracarbonyl, as well as quaternary ammonium radicals. By way of example, but not in limitation, suitable metals include the alkali metals, the alkaline earth metals, zinc, mercury, tin, iron, cobalt and the like. Preferred metal carbonyl salts for the purposes of this invention are those which are soluble in the reaction mixture, as for example, sodium cobalt tetracarbonyl and disodium iron tetracarbonyl, and other alkali metal cobalt and iron carbonyl salts which are soluble in the reaction mixture. The concentration of metal carbonyl salt is not important except in cases where the organic compound, $R_nZ$, reacts at an appreciable rate with water, alcohol, phenol, mercaptan, ammonia, hydrazine or organo-nitrogen base that is present. In these cases a higher metal carbonyl salt concentration favors the desired reaction of said organic compound with metal carbonyl salt over side reactions. In general, however, between about 1% and about 50% by weight, based on the weight of organic compound, $R_nZ$, of cobalt or iron carbonyl salt, will be employed.

Cobalt tetracarbonyl salts and iron tetracarbonyl salts are known materials, and various methods for preparing these materials are described in the literature. For example, preparation of sodium cobalt tetracarbonyl has been described in Z. Naturforsch., vol. 13B, page 192 (1958). The same author has also described preparation of disodium iron tetracarbonyl.

Sodium cobalt tetracarbonyl can be conveniently prepared by shaking cobalt octacarbonyl with excess 1% sodium amalgam in diethyl ether in a nitrogen atmosphere for about 5 hours at room temperature, to prepare a saturated ether solution of the sodium salt (about 0.07M). The color of the ether solution changes from dark red to colorless, thus indicating conversion of the colored cobalt octacarbonyl to colorless sodium cobalt tetracarbonyl. The ether is then evaporated off under vacuum, leaving solid, white sodium cobalt tetracarbonyl. Cobalt octacarbonyl is usually prepared shortly before use by reacting a cobalt salt such as cobalt acetate or carbonate in an inert hydrocarbon solvent with an excess of equal parts of carbon monoxide and hydrogen at a temperature between about 150° to about 170° C. and at a pressure of about 2000 pounds per square inch overnight with agitation. Upon chilling, orange colored crystalline cobalt octacarbonyl separates from the hydrocarbon diluent.

Disodium iron tetracarbonyl is readily prepared by shaking iron pentacarbonyl (commercially available as a yellow liquid) with excess 1% sodium amalgam in tetrahydrofuran in a nitrogen atmosphere for about 5 hours at room temperature to prepare a solution in tetrahydrofuran of disodium iron tetracarbonyl (about 0.1 M), which solution is usually used directly for the purposes of this invention.

The organo-metal carbonyl complex formed by reaction of an organic compound, $R_nZ$, with a cobalt or iron carbonyl salt then absorbs carbon monoxide to form an acyl metal carbonyl complex, which absorption is favored by employing an excess of carbon monoxide over theoretical stoichiometric requirements. Preferably a large excess of carbon monoxide is employed, and the reaction is usually and conveniently carried out in an atmosphere of carbon monoxide. However, pure carbon monoxide need not necessarily be used in this reaction, and mixtures of carbon monoxide with such gases as nitrogen, argon, methane, ethane, and the like, which are inert with respect to the carboxylation reaction, are entirely satisfactory for the purposes of this invention. A wide range of pressures has been found suitable for the purposes of this invention, from about atmospheric or less to about 5,000 pounds per square inch or more. Pressures between about atmospheric and about 2,000 pounds per square inch are preferred. Similarly, the process of this invention can be carried out within a wide range of temperatures, from about −20° C. to about 150° C. or even higher. Preferred temperatures are between about 0° C. and about 100° C.

The acyl metal carbonyl complex formed by absorption of carbon monoxide by the organo-metal carbonyl complex then reacts with a material of the group consisting of water, alcohols, phenols, mercaptans, ammonia, hydrazine, primary organo-nitrogen bases and secondary organo-nitrogen bases under basic conditions of reaction to form a salt, an ester, a thioester, an amide, a hydrazide, or the like of a carboxylic acid. All of the above compounds are characterized by having an —OH, an —SH, or an >NH group as the reactive group for the purposes of this invention in an acyclic, alicyclic, aromatic, aralkyl, or heterocyclic compound, from which reactive group hydrogen is replaceable. This invention, therefore, contemplates the use of a wide variety of alcohols, phenols, mercaptans, primary or secondary organo-nitrogen bases since it is only the —OH, —SH, or >NH groupings in these compounds which enter into reaction with the acyl metal carbonyl complex to form the carboxylic acid derivatives of this invention. In the case of water, a salt of a carboxylic acid is obtained, since sufficient base must be present to prevent accumulation of any free acid. Esters are formed by reaction with alcohols and phenols, whereas thio-esters are formed by reaction with mercaptans. Unsubstituted, monosubstituted and disubstituted amides are formed, respectively, by reaction with ammonia, primary and secondary amines. For example, use of ammonia leads to formation of an unsubstituted amide, methylamine leads to formation of an N-methylamide, and dimethylamine leads to formation of a dimethylamide. A quantity in excess over theoretical stoichiometric requirements of the compound containing active —OH, —SH, or >NH groups is usually advisable, but is not necessary.

By way of example, but not in limitation, some typical alcohols suitable for the purposes of this invention include aliphatic alcohols such as methyl alcohol, ethyl alcohol, propyl alcohol, isopropyl alcohol, n-butyl alcohol, secondary butyl alcohol, n-hexyl alcohol, hexanol-2, n-octyl alcohol, capryl alcohol, isopropyl dodecyl alcohol, stearyl alcohol, ceryl alcohol, myricyl alcohol, and the like; polyhydroxylic compounds such as ethylene glycol, diethylene glycol, glycerol, pentaerythritol, and the like; olefinic alcohols such as allyl alcohol, crotyl alcohol, buten-1-ol-4, penten-1-ol-5, 2,6-dimethylocten-1-ol-8, 3,7,11,15-tetramethylhexadecen-2-ol-1, and the like; cycloaliphatic alcohols such as cyclopentyl alcohol, cyclohexyl alcohol, methyl cyclohexyl alcohol, and the like; aralkyl alcohols such as benzyl alcohol, diphenylcarbinol, phenyl ethyl alcohol, ω-phenyl propyl alcohol, cinnamyl alcohol, and the like.

Some typically suitable phenols for the purposes of this invention include, by way of example, phenol, o-, m-, and p-cresols, carvacrol, thymol, catechol, veratrole, resorcinol, hydroquinone, pyrogallol, phloroglucinol, α-naphthol, β-naphthol, and the like.

Some typically suitable mercaptans for the purposes of this invention include, by way of example, aliphatic mercaptans, olefinic mercaptans, cycloaliphatic mercaptans, aralkyl mercaptans, aromatic mercaptans, such as methyl mercaptan, ethyl mercaptan, propyl mercaptan, n-butyl mercaptan, secondary butyl mercaptan, pinacolyl mercaptan, capryl mercaptan, dodecyl mercaptan, cetyl mercaptan, allyl mercaptan, crotyl mercaptan, 2,6-dimethylocten-1-thiol-8, cyclopentyl mercaptan, cyclohexyl mercaptan, methyl cyclohexyl mercaptan, benzyl mercaptan, phenyl ethyl mercaptan, cinnamyl mercaptan, and the like.

Some typically suitable primary and secondary organo-nitrogen bases for the purposes of this invention include, by way of example, primary and secondary aliphatic amines, primary and secondary olefinic amines, primary and secondary cycloaliphatic amines, primary and secondary aralkyl amines, primary and secondary aryl amines, secondary heterocyclic amines, and miscellaneous primary and secondary organo-nitrogen bases such as methyl amine, dimethyl amine, ethyl amine, diethyl amine, n-butyl amine, di-n-butyl amine, secondary butyl amine, di-secondary butyl amine, n-hexyl amine, di-n-hexyl amine, octyl amine, di(2-ethyl hexyl) amine, dodecyl amine, stearyl amine, allyl amine, diallyl amine, crotyl amine, dicrotyl amine, cyclopentyl amine, dicyclopentyl amine, cyclohexyl amine, dicyclohexyl amine, benzyl amine, dibenzyl amine, phenylethyl amine, diphenylethyl amine, cinnamyl amine, dicinnamyl amine, aniline, o-, m-, and p-toluidines, 1,2,3-xylidine, 1,2,4-xylidine, 1,3,2-xylidine, 1,3,5-xylidine, 1,3,4-xylidine, mesidine, pseudocumidine, monomethyl aniline, benzyl aniline, pyrrol, guanidine, and the like.

As pointed out previously, the reaction mixture must be kept basic in order to keep metal hydrocarbonyl from accumulating and to keep the metal of the carbonyl compound in a catalytically active form, and a wide variety of bases can be employed for this purpose. In general, however, a base should be selected which does not displace carbon monoxide from the cobalt or iron carbonyl complex to convert the same into an inactive form for the purposes of the invention. It is also desirable to select a base which does not react with the organic compound, $R_nZ$, more rapidly than the cobalt or iron carbonyl anion does.

Tertiary amines, such as for example, dicyclohexylethyl amine, which are relatively strong bases, and which are additionally sterically hindered, have been found to be of very general use in the present invention. Such tertiary amines react easily with acidic hydrogens (hydrocarbonyl) and do not react rapidly with organic compound, $R_nZ$, to form quaternary salts. Other typically suitable tertiary amines include, for example, tri-n-butylamine, 2,6-dimethylpyridine, and di-n-butylaniline. Another base of very general use in this invention is lime. In cases where esters are being prepared, the alkoxides, such as for example, the sodium or potassium salts of the alcohol being used are convenient bases to use. In some cases these alkoxides may react more rapidly with the organic compound, $R_nZ$, present than said organic compound does with the metal carbonyl anion. In such cases this side reaction may be minimized by adding the alkoxide gradually during the reaction, thus keeping the reaction mixture only slightly basic. This same procedure is also effective for any other base, such as the alkali metal hydroxides, which tends to react with the organic compound, $R_nZ$, more rapidly than said organic compound reacts with the cobalt or iron carbonyl salt. Another effective means for preventing the undesired reaction of base with organic compound, $R_nZ$, is to practice the invention as a two-step process by reacting said organic compound and carbon monoxide in the presence of cobalt or iron carbonyl salt to form an acyl cobalt or iron carbonyl complex, and thereafter reacting the thus-formed acyl cobalt or iron carbonyl complex with water, alcohol, phenol, mercaptan, ammonia, hydrazine or organo-nitrogen base under basic conditions of reaction. In cases where amides, and amide-like derivatives of carboxylic acids are being formed, the ammonia, hydrazine, or primary or secondary organo-nitrogen base is a strong enough base itself to keep the cobalt tetracarbonyl anion or the iron tetracarbonyl anion from being destroyed, and no other base need be added. Generally, an excess of basic reacting compound is employed over the theoretical stoichiometric amount required to react with the acidic hydrogen formed during the reaction.

A variety of solvents can be used as the reaction medium for the process of this invention. Solvents which dissolve the cobalt or iron carbonyl salts are preferred, although they are not necessarily required. Solvents such as diethyl ether, dimethyl ether, diisopropyl ether, tetrahydrofuran, dioxane, dimethyl ether of diethylene glycol, dimethyl ether of ethylene glycol, acetonitrile, dimethylformamide, and the like, may be used as inert solvents. In many cases one of the reactants, if liquid, can be used as the solvent, such as for example, methanol, ethanol, aniline, ethyl mercaptan, dimethyl amine, and the like.

The general nature of the invention having been set forth, the following examples illustrate some specific embodiments of the invention. It is to be understood, however, that the invention is in no way limited to the examples, since this invention may be carried out by the use of various modifications and changes within the scope of the invention as set forth herein.

*Example 1*

A closed reaction vessel fitted with a manometer was flushed free of air and filled with methanol-saturated carbon monoxide at atmospheric pressure, whereupon 9 ml. of methanol, 3 ml. of dicyclohexylethylamine, and 1 ml. of 1.0 M sodium cobalt tetracarbonyl in methanol were introduced into the carbon monoxide filled vessel, and to this was then added 1 ml. of benzyl bromide (9 mmoles). The temperature of the reaction vessel was maintained at 50° C. The solution turned black and began absorbing carbon monoxide. After 1 hour and 11 minutes, 2.5 mmoles of carbon monoxide had been absorbed and the reaction stopped. There was obtained a 25% yield, approximately, based on the starting benzyl bromide, of methyl phenylacetate. The infrared spectrum of the reaction mixture solution clearly showed a strong ester carbonyl band at 5.76 microns and a sodium cobalt tetracarbonyl band at 5.3 microns. To the reaction mixture was then added 0.1 g. of ammonium chloride and 5 ml. of benzyl amine, and the solution was heated on the steam bath for 2–3 hours. Evaporation of the solvent followed by addition of ice and water produced a solid which was filtered off and recrystallized several times from aqueous alcohol. There was obtained approximately 1.8 mmoles of N-benzylphenylacetamide having a melting point of 119.5–121° C., the melting point of pure N-benzylphenylacetamide being 121–123° C., and the melting point of a mixture of pure N-benzylphenylacetamide and the N-benzylphenylacetamide prepared in this example was 120–123° C.

*Example 2*

A closed reaction vessel fitted with a manometer was flushed free of air and filled with methanol-saturated carbon monoxide at atmospheric pressure, and 9 ml. of methanol, 3 ml. of dicyclohexylethylamine, and 1 ml. of 1.0 M sodium cobalt tetracarbonyl in methanol were introduced into the carbon monoxide filled vessel. One (1) ml. of 1-iodooctane (6 mmoles) was then introduced into the reaction vessel which was maintained at 50° C. for about 15 hours. Carbon monoxide was slowly absorbed. The infrared spectrum of the solution clearly showed a strong ester carbonyl band at 5.76 microns. The products of the reaction were analyzed by gas chromatography, and there was obtained a 56% yield of methyl nonanoate, based on the starting 1-iodooctane.

*Example 3*

A closed reaction vessel fitted with a manometer was flushed free of air and filled with methanol-saturated carbon monoxide at atmospheric pressure, and 10 ml. of 0.15 M sodium cobalt tetracarbonyl in methanol, and 6 ml. of 1.0 M sodium methoxide in methanol were introduced into the carbon monoxide filled vessel. One (1) ml. of 2-iodooctane (6 mmoles) was then introduced into the reaction vessel which was maintained at 25° C. for about 16 hours. Carbon monoxide was slowly absorbed. The products of the reaction were analyzed by gas chromatography, and there was obtained a 40.8% yield of methyl 2-methyloctanoate based on the starting 2-iodooctane.

*Example 4*

A closed reaction vessel fitted with a manometer was flushed free of air and filled with methanol-saturated carbon monoxide at atmospheric pressure, and 20 ml. of 0.10 M sodium cobalt tetracarbonyl in methanol, 2 ml. of dicyclohexylethylamine, and 1.214 g. (6.5 mmoles) of methyl p-toluenesulfonate were introduced into the carbon monoxide filled vessel which was maintained at 50° C. The solution gradually turned brown and over a period of 16.5 hours, 118 ml. of carbon monoxide was absorbed. There was obtained a yield of approximately 33%, based on the starting methyl p-toluenesulfonate, of methyl acetate.

*Example 5*

A closed reaction vessel fitted with a manometer was flushed free of air and filled with methanol-saturated carbon monoxide at atmospheric pressure, and 10 ml. of 0.1 M disodium iron tetracarbonyl in methanol, and 6 ml. of 1.08 M sodium methoxide in methanol were introduced into the carbon monoxide filled vessel. One (1) ml. of 2-iodooctane was then introduced into the reaction vessel which was maintained at 25° C. After about 15 hours 2.8 mmoles of carbon monoxide had been absorbed. The products of the reaction were analyzed by gas chromatography, and there was obtained a 43% yield of methyl 2-methyloctanoate, based on the starting 2-iodooctane.

*Example 6*

In this example the same ingredients in the same quantities, and the same conditions of reaction were employed as set forth in Example 5 with the exception that 10 ml. of a 0.1 M solution of iron pentacarbonyl in methanol was employed in place of a solution of disodium iron tetracarbonyl as in Example 5. Substantially the same yield of methyl 2-methyloctanoate was obtained.

This example demonstrates that it is unnecessary to previously prepare pure disodium iron tetracarbonyl in order to effect its reaction in accordance with this invention, since it can be prepared in situ from alkali and iron carbonyl present in the reaction mixture. For example, sodium methoxide and iron pentacarbonyl in methanol effects in situ production of disodium iron tetracarbonyl which was just as effective for the purposes of this invention as the previously prepared disodium iron tetracarbonyl employed in Example 5.

*Example 7*

A solution of 1.5 g. (7.7 mmoles) of sodium cobalt tetracarbonyl was prepared in 25 ml. of methanol. To this was added 25 ml. of dicyclohexylethylamine and 15 ml. of 1-chlorooctane. This mixture was placed in a 110 ml. pressure vessel which was then charged with carbon monoxide to a pressure of 1,000 pounds per square inch. The charged pressure vessel was then heated to 100° C. for about 25 hours with shaking. The products of the reaction were analyzed by gas chromatography, and there was obtained a 16.4% yield of methyl 2-methyloctanoate and a yield of 76.7% of methyl nonanoate, based on conversion of 1-chlorooctane to esters.

*Example 8*

A closed reaction vessel fitted with a manometer was flushed free of air and filled with methanol-saturated carbon monoxide at atmospheric pressure, and 10 ml. of 1.0

M sodium cobalt tetracarbonyl in methanol, and 1 ml. of 1.0 M sodium methoxide in methanol were introduced into the carbon monoxide filled vessel. Then 0.1 ml. of allyl bromide was introduced into the reaction vessel which was maintained at 25° C. Carbon monoxide was slowly absorbed. When carbon monoxide absorption stopped, another 0.1 ml. of allyl bromide and 1 ml. of 1.0 M sodium methoxide in methanol was added. This was continued for a period of 6 hours, during which time 40 ml. of 1.0 M sodium methoxide in methanol and 3 ml. of allyl bromide were added. After reacting overnight at 35° C., 12.2 mmoles of carbon monoxide had been absorbed. There was obtained a 35% yield of methyl 3-butenoate, based on the allyl bromide added, and the product isolated by distillation of the reaction mixture had an infrared spectrum nearly identical with pure methyl 3-butenoate.

*Example 9*

A closed reaction vessel fitted with a manometer was flushed free of air and filled with methanol-saturated carbon monoxide at atmospheric pressure, and 10 ml. of 1.0 M sodium cobalt tetracarbonyl in methanol, and 5 ml. of dicyclohexylethylamine were introduced into the carbon monoxide filled vessel. Then 1 ml., 1.381 g. (10.5 mmoles) of methyl chloroacetate was introduced into the reaction vessel which was maintained at 50° C. Carbon monoxide was rapidly absorbed initially, and then the reaction slowed down. After 3 hours, 2.1 mmoles of carbon monoxide had been absorbed, and the reaction became very slow, whereupon 1 ml. of methyl chloroacetate was added to the reaction mixture. After the reaction had stopped, the infrared spectrum of the reaction mixture showed a large ester carbonyl band at 5.75 microns. Dimethylmalonate having a saponification equivalent of 68.6 was recovered by distillation of the reaction mixture.

*Example 10*

A closed reaction vessel fitted with a manometer was flushed free of air and filled with methanol-saturated carbon monoxide at atmospheric pressure, and 10 ml. of 0.1 M sodium cobalt tetracarbonyl in methanol, and 3 ml. of dicyclohexylethylamine were introduced into the carbon monoxide filled vessel. Then 0.80 g. (4.57 mmoles) of α,α'-dichloro-p-xylene was introduced into the reaction vessel which was maintained at 50° C. In about 2 hours 2.02 mmoles of carbon monoxide had been absorbed, and the reaction became very slow. The ester produced by this reaction, namely, dimethyl p-phenylenediacetate, was then hydrolyzed by adding a solution of 1 g. of sodium hydroxide in 5 ml. of water, and then refluxing the reaction mixture for 1 hour. Evaporation of the reaction mixture to approximately half its volume, followed by addition of water and hydrochloric acid, resulted in separation of crude p-phenylenediacetic acid. A recrystallization of the crude acid from aqueous alcohol produced a 32% yield, based on the starting α,α'-dichloro-p-xylene, of p-phenylenediacetic acid melting at 238–245° C.

*Example 11*

A closed reaction vessel fitted with a manometer was flushed free of air and filled with methanol-saturated carbon monoxide at atmospheric pressure, and 10 ml. of 0.1 M sodium cobalt tetracarbonyl in methanol, and 3 ml. of dicyclohexylethylamine were introduced into the carbon monoxide filled vessel. Then 1.75 g. (10 mmoles) of 1-chloromethylnaphthalene were added to the reaction vessel which was maintained at 50° C. The reaction mixture turned dark red and carbon monoxide was absorbed. After reacting overnight, the ester formed, namely, methyl α-naphthylacetate, was hydrolyzed by adding 1 g. of potassium hydroxide dissolved in 5 ml. of methanol, and then refluxing for 1 hour. The reaction mixture was evaporated to approximately half its volume, and aqueous hydrochloric acid was added resulting in separation of crude α-naphthylacetic acid. The crude acid was recovered by filtration and was recrystallized from aqueous ethyl alcohol. There was obtained 1.3 g., or a 71% yield, based on the starting 1-chloromethylnaphthalene, of α-naphthylacetic acid melting at 128.5–130° C.

*Example 12*

A closed reaction vessel fitted with a manometer was flushed free of air and filled with tetrahydrofuran-saturated carbon monoxide at atmospheric pressure, and 10 ml. of 0.1 M sodium cobalt tetracarbonyl in tetrahydrofuran, and 1 ml. of aniline were introduced into the carbon monoxide filled vessel. Then 2 ml. of 1.0 M benzyl chloride in tetrahydrofuran were added to the reaction vessel which was maintained at 35° C. After reacting overnight at 35° C., the green reaction mixture solution was poured onto ice and hydrochloric acid, whereupon a brownish solid separated, which was recovered and dried. Recrystallization of the dry recovered solid from aqueous methanol gave a 47% yield, based on the starting benzyl chloride, of phenylacetanililde melting at 115–116° C.

*Example 13*

A closed reaction vessel fitted with a manometer was flushed free of air and filled with methanol-saturated carbon monoxide at atmospheric pressure, and 50 ml. of 0.1 M sodium cobalt tetracarbonyl in diethyl ether solution, and 1 ml. (2.3 g.) of methyl iodide were introduced into the carbon monoxide filled vessel which was maintained at 0° C. Carbon monoxide was absorbed, and in 4 hours and 45 minutes 145.4 ml. of carbon monoxide had been absorbed. Then 6 ml. of 1.0 M sodium thiophenoxide in methanol were added to the reaction mixture which was maintained at 0° C. The reaction mixture turned black and a slow absorption of carbon monoxide took place. In 50 minutes 38 ml. of carbon monoxide had been absorbed and the reaction was still going at the same rate. The reaction mixture was then allowed to warm up to room temperature and the reaction was continued at room temperature overnight. Distillation of the reaction mixture in vacuum led to isolation of phenyl thioacetate identified by its infrared spectrum.

*Example 14*

In a closed reaction vessel fitted with a manometer were placed 1.3 g. of lithium iodide and 1 g. of calcium oxide. The reaction vessel was then flushed free of air and filled with carbon monoxide at atmospheric pressure, and 10 ml. of 1.0 M sodium cobalt tetracarbonyl in methanol was added to the reaction vessel. The mixture of ingredients was stirred at 30° C. and 1.23 g. of methyl chloroacetate was added. In 20 hours 4.06 mmoles of carbon monoxide was absorbed, and there was obtained a 36% yield based on the starting methyl chloroacetate of dimethyl malonate. Lithium iodide was used in this example to convert methyl chloroacetate into the more reactive methyl iodoacetate. The use of lithium iodide was not necessary, but was desirable since by this means the rate of the reaction was increased, and the yield of ester obtained was improved.

*Example 15*

A closed reaction vessel fitted with a manometer was flushed free of air and filled with methanol-saturated carbon monoxide at atmospheric pressure, and 10 ml. of 1.0 M sodium cobalt tetracarbonyl in methanol and 10 ml. of dicyclohexylethylamine were introduced into the carbon monoxide filled reaction vessel. The reaction mixture was stirred at 25° C. and 1.51 g. of methyl α-bromopropionate was added thereto. The reaction mixture turned red-brown in color, and carbon monoxide was absorbed. The product obtained was dimethyl methyl malonate.

Example 16

A closed reaction vessel fitted with a manometer was flushed free of air and filled with ethanol-saturated carbon monoxide at atmospheric pressure, and 20 ml. of 0.1 M sodium cobalt tetracarbonyl in ethanol, and 3 ml. of dicyclohexylethylamine was introduced into the carbon monoxide filled vessel. Then 1 ml. (1.51 g. or 7.6 mmoles) of pure 1-iodopentane was introduced into the reaction vessel which was maintained at 50° C. Gas absorption commenced immediately, and in 21.5 hours 2.5 mmoles of carbon monoxide had been absorbed and the reaction had nearly stopped. There was obtained a 33% yield, based on the starting 1-iodopentane, of ethyl hexanoate.

Example 17

Example 16 was repeated except that cyclohexanol was employed in place of ethanol. The product obtained was cyclohexyl hexanoate.

Example 18

A closed reaction vessel fitted with a monometer was flushed free of air and filled with methanol-saturated carbon monoxide at atmospheric pressure, and 12 ml. of 0.1 M sodium cobalt tetracarbonyl in methanol, and 3 ml. of dicyclohexylethylamine were added to the carbon monoxide filled reaction vessel. Then 0.1241 g. of chloromethyl methyl ether was introduced into the reaction vessel which was maintained at 25° C. The reaction mixture turned dark red, and carbon monoxide was absorbed. The product obtained was methyl methoxyacetate.

Example 19

A closed reaction vessel fitted with a manometer was flushed free of air and filled with methanol-saturated carbon monoxide at atmospheric pressure, and 20 ml. of 0.10 M sodium cobalt tetracarbonyl in methanol, 2 ml. of dicyclohexylethylamine, and 1 ml. (7.7 mmoles) of diethylsulfate were introduced into the carbon monoxide filled vessel which was maintained at 50° C. The solution turned brown, and in 20 hours 85 ml. of carbon monoxide were absorbed, and the reaction stopped. The product obtained was methyl propionate.

It will be apparent from the foregoing description, therefore, that the present invention provides a new and useful process for the preparation of all manner of carboxylated organic compounds. Furthermore, the carboxylated organic compounds produced thereby are suitable for the various conventional uses for such products, such for example, as solvents, as plasticizers for synthetic and natural polymeric materials, as surface active agents, as ingredients in the manufacture of insecticides, miticides and fungicides, as ingredients in the manufacture of synthetic resins and polymers, and the like.

What I claim and desire to protect by Letters Patent is:

1. A process for preparing carboxylated organic compounds which comprises reacting, at temperatures from about −20° C. to about 150° C. and pressures up to about 5,000 pounds per square inch, ingredients consisting essentially of carbon monoxide and an organic compound of the group consisting of organic compounds having the following general formulas, RX, $RX_2$, $ROSO_2R'$ and $R_2SO_4$, in which R represents an organic radical of the group consisting of saturated and ethylenically unsaturated aliphatic and cycloaliphatic hydrocarbon radicals and substituted saturated and ethylenically unsaturated aliphatic and cycloaliphatic hydrocarbon radicals wherein the substituent is selected from the group consisting of alkoxy, acyl, acyloxy, aryl, nitro, nitrato, and cyano substituents, X is a halogen, and R' represents an organic radical of the group consisting of alkyl, alkenyl, cycloalkyl, aryl, and aralkyl radicals, said X, $X_2$, $OSO_2R'$, and $SO_4$ substituents being attached only to primary and secondary aliphatic and cycloaliphatic carbon atoms of said R radicals, with a salt of a metal hydrocarbonyl of the group consisting of cobalt hydrotetracarbonyl and iron dihydrotetracarbonyl to form an acyl metal carbonyl complex, and reacting, under the aforesaid conditions of temperature and pressure, the thus-formed acyl metal carbonyl complex with a material of the group consisting of water, alcohols, phenols, mercaptans, ammonia, hydrazine, and primary and secondary amines in the presence of sufficient base to keep the reaction mixture basic.

2. A process in accordance with claim 1 in which the salt of a metal hydrocarbonyl is sodium cobalt tetracarbonyl.

3. A process in accordance with claim 1 in which the salt of a metal hydrocarbonyl is disodium iron tetracarbonyl.

4. A process in accordance with claim 1 in which the organic compound is an alkenyl halide.

5. A process in accordance with claim 1 in which the organic compound is a dialkyl ester of sulfuric acid.

6. A process in accordance with claim 1 in which the organic compound is an dialkyl ester of a sulfonic acid.

7. A process in accordance with claim 1 in which said material is a mercaptan and the product obtained is a thioester.

8. A process in accordance with claim 1 in which said material is ammonia and the product obtained is an unsubstituted amide.

9. A process in accordance with claim 1 in which said material is a primary amine and the product obtained is a monosubstituted amide.

10. A process in accordance with claim 1 in which said material is a secondary amine and the product obtained is a disubstituted amide.

11. A process in accordance with claim 1 in which said material is hydrazine and the product obtained is a hydrazide.

12. A process for preparing carboxylated organic compounds which comprises reacting together, at temperatures from about −20° C. to about 150° C. and pressures up to about 5,000 pounds per square inch, ingredients consisting essentially of (1) an alkyl halide, (2) carbon monoxide, (3) a salt of a metal hydrocarbonyl of the group consisting of cobalt hydrotetracarbonyl and iron dihydrotetracarbonyl, and (4) a material of the group consisting of water, alcohols, phenols, mercaptans, ammonia, hydrazine, and primary and secondary amines in the presence of sufficient base to keep the reaction mixture basic.

13. A process for preparing carboxylated organic compounds which comprises reacting, at temperatures from about −20° C. to about 150° C. and pressures up to about 5,000 pounds per square inch, ingredients consisting essentially of carbon monoxide and an organic compound of the group consisting of organic compounds having the following general formulas, RX, $RX_2$, $ROSO_2R'$ and $R_2SO_4$, in which R represents an organic radical of the group consisting of saturated and ethylenically unsaturated aliphatic and cycloaliphatic hydrocarbon radicals and substituted saturated and ethylenically unsaturated aliphatic and cycloaliphatic hydrocarbon radicals wherein the substituent is selected from the group consisting of alkoxy, acyl, acyloxy, aryl, nitro, nitrato, and cyano substituents, X is a halogen, and R' represents an organic radical of the group consisting of alkyl, alkenyl, cycloalkyl, aryl, and aralkyl radicals, said X, $X_2$, $OSO_2R'$, and $SO_4$ substituents being attached only to primary and secondary aliphatic and cycloaliphatic carbon atoms of said R radicals, with a salt of a metal hydrocarbonyl of the group consisting of cobalt hydrotetracarbonyl and iron dihydrotetracarbonyl to form an acyl metal carbonyl complex, and thereafter reacting the thus-formed acyl metal carbonyl complex under the aforesaid conditions of temperature and pressure with a material of the group, consisting of water, alcohols, phenols, mercaptans, ammonia, hydrazine, and primary and secondary amines in the presence of sufficient base to keep the reaction mixture basic.

14. A process for preparing carboxylic acids which comprises reacting, at temperatures from about −20° C. to about 150° C. and pressures up to about 5,000 pounds per square inch, ingredients consisting essentially of carbon monoxide and an organic compound of the group consisting of organic compounds having the following general formulas, RX, RX$_2$, ROSO$_2$R' and R$_2$SO$_4$, in which R represents an organic radical of the group consisting of saturated and ethylenically unsaturated aliphatic and cycloaliphatic hydrocarbon radicals and substituted saturated and ethylenically unsaturated aliphatic and cycloaliphatic hydrocarbon radicals wherein the substituent is selected from the group consisting of alkoxy, acyl, acyloxy, aryl, nitro, nitrato, and cyano substituents, X is a halogen, and R' represents an organic radical of the group consisting of alkyl, alkenyl, cycloalkyl, aryl, and aralkyl radicals, said X, X$_2$, OSO$_2$R', and SO$_4$ substituents being attached only to primary and secondary aliphatic and cycloaliphatic carbon atoms of said R radicals, with a salt of a metal hydrocarbonyl of the group consisting of cobalt hydrotetracarbonyl and iron dihydrotetracarbonyl to form an acyl metal carbonyl complex, reacting the thus-formed acyl metal carbonyl complex under the aforesaid conditions of temperature and pressure with a material of the group consisting of water, alcohols, phenols, mercaptans, ammonia, hydrazine, and primary and secondary amines in the presence of sufficient base to keep the reaction mixture basic to form a derivative of carboxylic acid, and thereafter subjecting said derivative of carboxylic acid to hydrolysis with acidification to form carboxylic acid.

15. A process for preparing esters of carboxylic acids which comprises reacting together, at temperatures from about −20° C. to about 150° C. and pressures up to about 5,000 pounds per square inch, ingredients consisting essentially of (1) an organic compound of the group consisting of organic compounds having the following general formulas, RX, RX$_2$, ROSO$_2$R' and R$_2$SO$_4$, in which R represents an organic radical of the group consisting of saturated and ethylenically unsaturated aliphatic and cycloaliphatic hydrocarbon radicals and substituted saturated and ethylenically unsaturated aliphatic and cycloaliphatic hydrocarbon radicals wherein the substituent is selected from the group consisting of alkoxy, acyl, acyloxy, aryl, nitro, nitrato, and cyano substituents, X is a halogen, and R' represents an organic radical of the group consisting of alkyl, alkenyl, cycloalkyl, aryl, and aralkyl radicals, said X, X$_2$, OSO$_2$R', and SO$_4$ substituents being attached only to primary and secondary aliphatic and cycloaliphatic carbon atoms of said R radicals, (2) carbon monoxide, (3) a salt of a metal hydrocarbonyl of the group consisting of cobalt hydrotetracarbonyl and iron dihydrotetracarbonyl, (4) an alcohol, and (5) a base in sufficient amount to keep the reaction mixture basic.

16. A process in accordance with claim 15 in which the organic compound is an alkyl halide, said salt of a metal hydrocarbonyl is sodium cobalt tetracarbonyl, said alcohol is an alkanol, and said base is a tertiary amine.

17. A process in accordance with claim 15 in which the organic compound is an alkyl halide organic halide, said salt of a metal hydrocarbonyl is disodium iron tetracarbonyl, said alcohol is an alkanol, and said base is an alkali metal alkoxide of said alcohol.

18. A process in accordance with claim 15 in which the organic compound is an alkyl ester of a sulfonic acid, said salt of a metal hydrocarbonyl is sodium cobalt tetracarbonyl, said alcohol is an alkanol, and said base is a tertiary amine.

19. A process in accordance with claim 15 in which the organic compound is a dialkyl ester of sulfuric acid, said salt of a metal hydrocarbonyl is sodium cobalt tetracarbonyl, said alcohol is an alkanol, and said base is a tertiary amine.

20. A process for preparing esters of carboxylic acids which comprises reacting together, at temperatures from about −20° C. to about 150° C. and pressures up to about 5,000 pounds per square inch, ingredients consisting essentially of (1) an organic compound of the group consisting of organic compounds having the following general formulas, RX, RX$_2$, ROSO$_2$R' and R$_2$SO$_4$, in which R represents an organic radical of the group consisting of saturated and ethylenically unsaturated aliphatic and cycloaliphatic hydrocarbon radicals and substituted saturated and ethylenically unsaturated aliphatic and cycloaliphatic hydrocarbon radicals wherein the substituent is selected from the group consisting of alkoxy, acyl, acyloxy, aryl, nitro, nitrato, and cyano substituents, X is a halogen, and R' represents an organic radical of the group consisting of alkyl, alkenyl, cycloalkyl, aryl, and aralkyl radicals, said X, X$_2$, OSO$_2$R', and SO$_4$ substituents being attached only to primary and secondary aliphatic and cycloaliphatic carbon atoms of said R radicals, (2) carbon monoxide, (3) a salt of a metal hydrocarbonyl of the group consisting of cobalt hydrotetracarbonyl and iron dihydrotetracarbonyl, (4) a phenol, and (5) a base in sufficient amount to keep the reaction mixture basic.

21. A process for preparing salts of carboxylic acids which comprises reacting, at temperatures from about −20° C. to about 150° C. and pressures up to about 5,000 pounds per square inch, ingredients consisting essentially of carbon monoxide and an organic compound of the group consisting of organic compounds having the following general formulas, RX, RX$_2$, ROSO$_2$R', and R$_2$SO$_4$, in which R represents an organic radical of the group consisting of saturated and ethylenically unsaturated aliphatic and cycloaliphatic hydrocarbon radicals and substituted saturated and ethylenically unsaturated aliphatic and cycloaliphatic hydrocarbon radicals wherein the substituent is selected from the group consisting of alkoxy, acyl, acyloxy, aryl, nitro, nitrato, and cyano substituents, X is a halogen, and R' represents an organic radical of the group consisting of alkyl, alkenyl, cycloalkyl, aryl, and aralkyl radicals, said X, X$_2$, OSO$_2$R', and SO$_4$ substituents being attached only to primary and secondary aliphatic and cycloaliphatic carbon atoms of said R radicals, with a salt of a metal hydrocarbonyl of the group consisting of cobalt hydrotetracarbonyl and iron dihydrotetracarbonyl to form an acyl metal carbonyl complex, and thereafter reacting the thus-formed acyl metal carbonyl complex under the aforesaid conditions of temperature and pressure with water in the presence of sufficient base to neutralize all acid formed.

References Cited in the file of this patent

UNITED STATES PATENTS

| | | |
|---|---|---|
| 2,565,462 | Prichard et al. | Aug. 28, 1951 |
| 2,565,463 | Tabet | Aug. 28, 1951 |